United States Patent
Crouch et al.

US006292842B1

(10) Patent No.: US 6,292,842 B1
(45) Date of Patent: Sep. 18, 2001

(54) METHOD FOR TRANSFERRING DATA TO AN APPLICATION

(75) Inventors: Scott Crouch, Steamboat Springs; Virgil Russon, Greeley, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/141,922

(22) Filed: Aug. 28, 1998

(51) Int. Cl.$^7$ ........................................... G06F 9/54
(52) U.S. Cl. .................................................. 709/329
(58) Field of Search ..................... 709/106, 310–332, 709/200–253; 710/100; 705/35

(56) References Cited

U.S. PATENT DOCUMENTS

| | | | |
|---|---|---|---|
| 5,301,268 | * 4/1994 | Takeda | 709/329 |
| 5,557,798 | * 9/1996 | Skeen et al. | 705/35 |
| 5,564,044 | * 10/1996 | Pratt | 709/106 |
| 5,630,074 | * 5/1997 | Beltran et al. | 709/314 |
| 5,911,066 | * 6/1999 | Williams et al. | 709/310 |
| 5,966,531 | * 10/1999 | Skeen et al. | 709/315 |
| 5,991,520 | * 11/1999 | Smyers et al. | 710/100 |

OTHER PUBLICATIONS

North, Ken, Understanding OLE: Microsoft's Language--Independent, Binary Standard Forobject Sharing On Desktops and Across Networks, DBMS, v8, n7, p. 50(7), Jun. 1995.*

Brockschmidt, Kraig, "When to Use Which OLE Technology," MSDN Library, White Paper, pp. 1–17, Feb. 1995.*
(no author given), "Inset Systems releases HiJaak for Windows; popular conversion utility includes image viewing and processing," Seybold Report on Desktop Publishing, v6, n11, p. 28(1), Jul. 6, 1992.*
Powell, James E., "HiJaak 1.0," Windows Magazine, No. 311, 310, Dec. 1, 1992.*
Richter, Jeffrey, "Drop Everything: How to Make Your Applicatin Accept and Source Drag–and–Drop Files," Microsoft Systems Journal, May–Jun., 1992, pp. 19–30.*
Welch, Kevin P., "Interprogram Communications Using Windows' Dynamic Data Exchange," Microsoft Systems Journal, Nov. 1987, pp. 13–38.*

* cited by examiner

*Primary Examiner*—St.John Courtenay, III

(57) ABSTRACT

A system of destination modules for transferring data from a source application to a destination application. When sending data, the source application loads a target destination module to perform the transfer. When there is more than one access mechanism available, the target destination module selects one of the access mechanisms, and loads an access mechanism destination module to process the data using the selected access mechanism. Similarly, if more than one data format can be used in the transfer, the access mechanism destination module chooses a data format and loads a data format destination module to process the data using the chosen data format. All three chained destination modules use the same interface, such that a destination module does not need to know if the module it calls to perform an operation uses another destination module to actually accomplish the operation.

17 Claims, 10 Drawing Sheets

METHOD FOR TRANSFERRING DATA TO AN APPLICATION

FIELD OF THE INVENTION

This invention relates to computer systems and more particularly to transferring data within such computer systems. Even more particularly, the invention relates to formatting and transferring data between two applications within a computer system.

BACKGROUND OF THE INVENTION

When a source application program needs to transfer data to a destination application program, there is usually more than one access mechanism available to use in the transfer. For example within the Microsoft Windows® operating system, a source application could use OLE automation to transfer the data, or the source application might save the data into a file, then start the destination application and pass the file name on the command line so that the destination application then reads the file.

Similarly, the data can often be transferred using one of several data formats. For example, image data can often be transferred using a bit map image file (BMP), a GIF image file, JPEG, etc. A destination application program may only be able to accept one of these formats, or the destination application program may be able to accept more than one format, in which case, one of the formats can be selected.

When the source application is designed to obtain data from an input device, and the data is then sent to one of many different destination application programs, using one of several different access mechanisms, and using one of several different data formats, the number of combinations becomes very large. Prior art methods of transferring data used a different program for each combination, such that, for example, there is a program for transferring data to Microsoft Word using OLE automation and using the BMP data format. A second transfer program must be used to transfer to Microsoft Word using OLE automation with the GIF data format. A third transfer program is needed to transfer to Word using BMP and launching word with the file name on the command line. Thus, in the prior art, large numbers of transfer programs are needed to transfer data to several application programs using only a few access mechanisms and only a few data formats, because of the large number of combinations that arise.

Also, when the transfer programs are created, they naturally tend to copy programming code when creating a new transfer program, since often the operation is the same. For example, the code to format data into the BMP format might be used in most transfer programs that transfer using the BMP data format. However, if this code needs to be modified, it has to be modified in each of the programs that use the code, thus incurring high cost, and reduced reliability.

Another disadvantage of this method is that a new receiving application program cannot receive data until a new transfer program is written for it, even if it is capable of using the same access mechanism, since the transfer programs are all tailored to each particular receiving application.

It is thus apparent that there is a need in the art for an improved method or apparatus that reduces the number of transfer programs needed to transfer data from one application program to other application programs using a variety of access mechanisms and data formats. The present invention meets these and other needs in the art.

SUMMARY OF THE INVENTION

It is an aspect of the present invention to transfer data from one computer application to another.

It is another aspect of the invention to transfer data from a device to an application within a computer system.

Another aspect of the invention is to use multiple levels of modules when transferring data.

Still another aspect of the invention is that each level of modules is designed to use the same state machine and the same interface.

A further aspect of the invention is to dynamically choose the method of transferring data to the application.

A still further aspect of the invention is to dynamically choose the format of the data being transferred to the application.

The above and other aspects of the invention are accomplished in a system of chained destination modules. When a source application wants to send data to a destination application, the source application loads a first chained destination module to perform the transfer. The first chained destination module determines whether there is more than one access mechanism available to transfer the data to the destination application. If there is more than one access mechanism available, the first chained destination module chooses one of the access mechanisms, and loads a second chained destination module to process the data using the chosen access mechanism.

Similarly, if more than one data format can be used in the transfer, the second chained destination module chooses a data format and loads a third chained destination module to process the data using the chosen data format.

In addition, lower levels of chained destination modules can be used to break down the process into even more detailed levels.

All chained destination modules use the same interface, such that a destination module does not need to know if the module it calls to perform an operation uses a lower level chained destination module to actually accomplish the operation.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
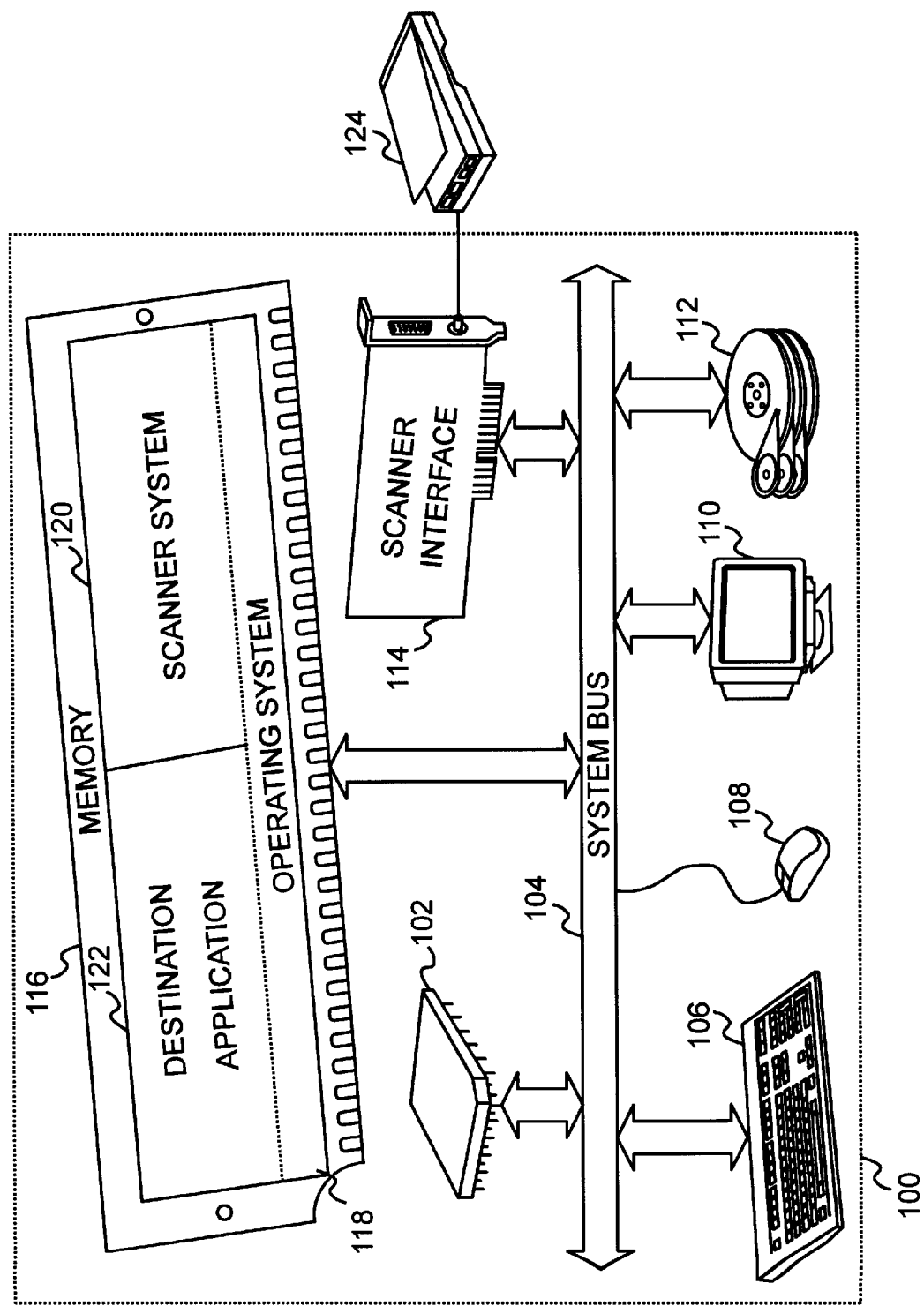
FIG. 1 shows a computer system incorporating the present invention.

FIG. 1 shows a computer system incorporating the present invention. Referring now to FIG. 1, a computer system 100 contains a processor 102 which communicates to other elements of the computer system 100 over a system bus 104. A keyboard 106 allows text input to the computer system 100 and a mouse graphical input device 108 allows graphical input to the computer system 100. A display device 110 allows the computer system 100 to display text or graphical information to the user of the computer system 100 and a disk storage device 112 stores the software and data used with the present invention within the computer system 100. A scanner interface 114 connects to a scanner device 124 to allow the computer system 100 to scan documents and receive visual images into the computer system 100. Those skilled in the art will recognize that the scanner could also interface to the computer system 100 through a conventional parallel port or a conventional serial port.

A memory 116 within the computer system 100 contains an operating system 118, which may typically be either the Microsoft Windows® operating system or the Unix® operating system. Scanner system software 120, of the present invention, controls the scanner device 124 through the scanner interface 114 to scan documents. The scanner system 120 also transfers data from the scanned documents into a destination application 122 also running within the memory 116. As will be described below, the destination application 122 does not have to be running at the same time as the scanner software 120.

Figure 2:
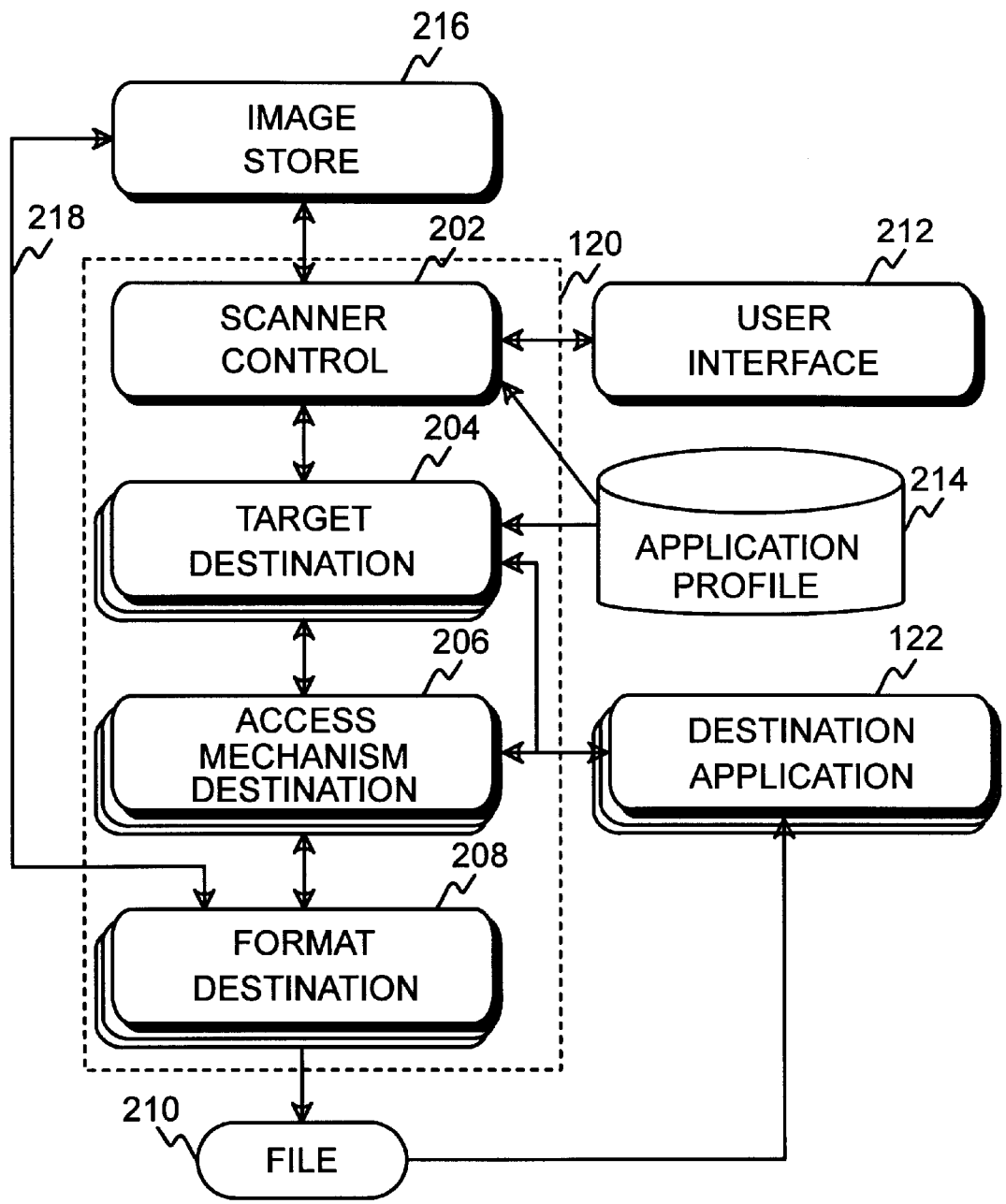
FIG. 2 shows a block diagram of the chained destination modules of the present invention.

FIG. 2 shows a block diagram of the chain destination modules of the present invention. Referring now to FIG. 2, the scanner system software 120 (also shown in FIG. 1) is comprised of scanner control software 202 which connects to user interface software 212. The user interface software 212 may be contained within the scanner system software 120. Scanner control software 202 activates the scanner device 124 (FIG. 1) through the scanner interface 114 (FIG. 1) to scan a document and store the data into the image store 216. Scanner control software 202 also reads information from an application. profile file 214 which tells the scanner control software 202 the data format and access mechanisms for transferring data into each destination application program 122 to which the present invention can transfer data.

When the user selects a destination application 122, through the user interface 212, scanner control software 202 reads a record from the application profile file 214 to determine the access mechanism and data formats available to transfer data to the destination application 122 selected by the user. Scanner control software 202 selects a target destination module 204 from one of several target destination modules, depending upon the particular destination application 122 chosen by the user. Typically, there will be one target destination module 204 for each destination application 122.

The chosen target destination module 204 may also examine the application profile file 214 to determine which type of access mechanism is suitable for transferring data into the chosen destination application 122. Once the target destination module 204 selects the access mechanism, it will load an appropriate access mechanism module 206 for the selected access mechanism. The target destination module 204 may select the access mechanism destination module 206 in many ways, one of which is explained below with respect to FIG. 9.

The access mechanism destination module 206 may have several different data formats available for transferring the data to the destination application 122. The access mechanism 206 selects one of the data formats and loads an appropriate format destination module 208 for the selected data format. The access mechanism module 206 may select the format destination module 208 in many ways, one of which is explained below with respect to FIG. 10.

Once a target destination module 204 has been selected for the particular destination application 122, and once a particular access mechanism 206 has been selected for the particular conditions that exist within the computer system for the destination application 122, and once a data file format has been selected and an appropriate format destination module 208 selected, the data can be transferred from the image store 216, which was created by the scanner control 202, formatted by the format destination module 208, and transferred to the destination application 122 either by the access mechanism destination module 206 through a memory transfer, or by writing the data to a file 210 and passing the name of the file from the access mechanism destination 206 to the destination application 122 which then loads the data from the file 210.

A target destination module is one that is knowledgeable about a particular target application. For example, there would be typically be one target destination module to send data to each specific application program. Access mechanism destination modules are less specific than target destination modules in that access mechanism destination modules are designed for a particular way of getting data into any one of a number of application programs. The format destination modules are the least specific in that they are designed to deal with a particular data format regardless of how the data created in that format gets to the destination application and regardless of which application program is the destination application. A more specific destination module is responsible for creating a next level down or less specific destination module, for example the target destination is responsible for loading and starting an access mechanism destination module. The more specific destination module is also responsible for destroying (removing from memory) the next level destination module after the data has been transferred. The more specific module is responsible for configuring the less specific destination module and a more specific module must pass a message it receives to the less specific modules if the more specific module does not process the message.

Although only three levels of chained destination modules are shown, the invention is not so limited. Any number of levels of chained destination modules could be used with the invention. For example, the data format may be comprised of multiple levels, and each level of the data format would add an additional chained destination module.

Figure 3:
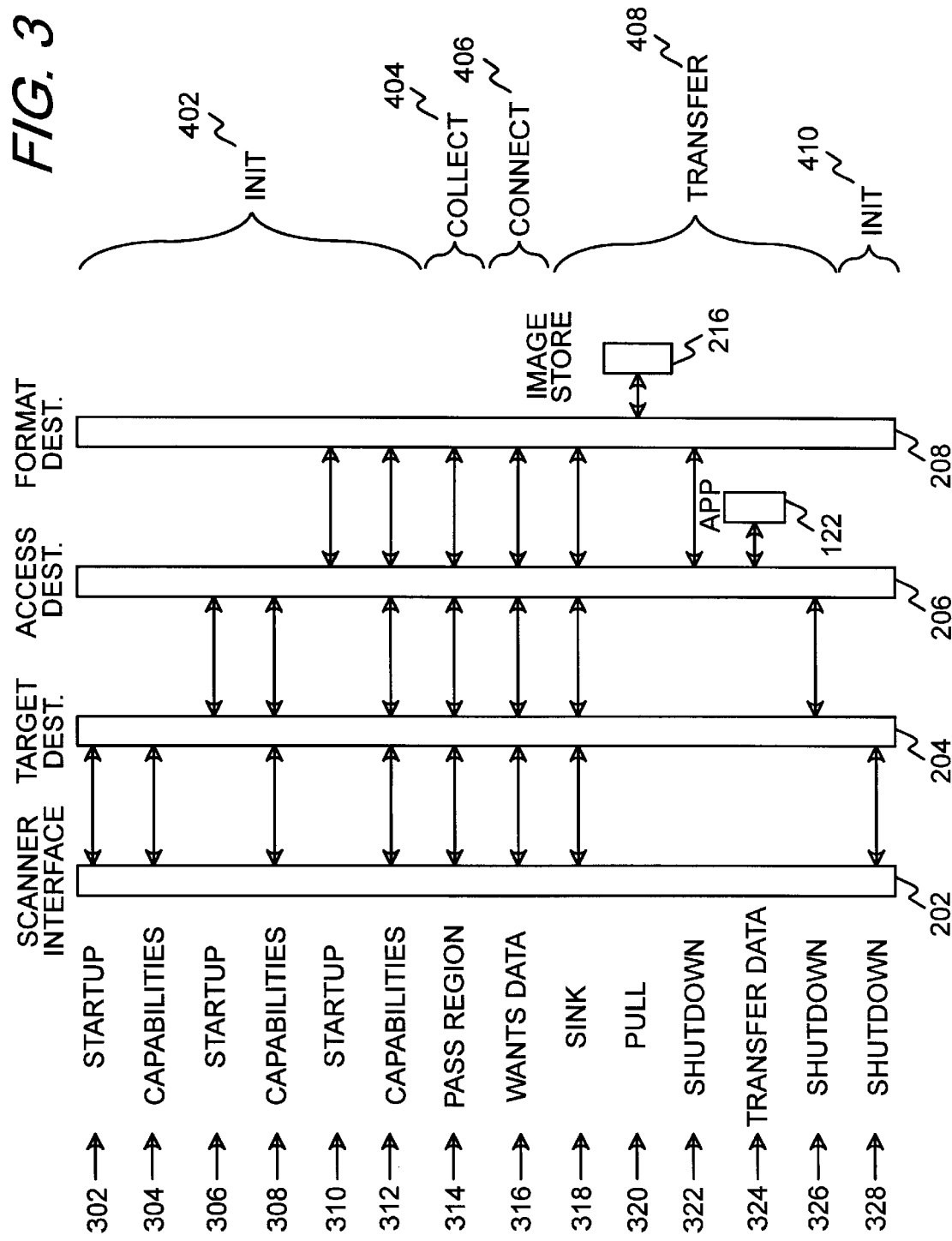
FIG. 3 shows a diagram of the calls between the destination modules of the invention.

FIG. 3 shows a diagram of the calls between the scanner control software 202 and the destination modules of the invention. Referring now to FIG. 3, after a user selects a particular destination application 122 (FIG. 1), the scanner control software 202 chooses the correct target destination module 204 for the selected destination application 122, loads the target destination module 204, and sends a START UP message 302 which starts the target destination module 204. Subsequently, scanner control software 202 (FIG. 2) may send one or more CAPABILITIES messages 304 to the target destination module 204 to initialize it and set up its parameters.

The target destination module 204 chooses an access mechanism destination module 206, loads it, and sends a START UP message 306 to the access mechanism destination module 206 to initialize the access mechanism destination module 206. Subsequently, scanner control software 202 may send one or more CAPABILITIES messages 308 to the target destination module, which determines that the message should be processed by a less specific module, so the target destination module 204 passes the CAPABILITIES messages 308 onto the access mechanism destination module 206.

The access mechanism destination module 206 then chooses a data format, loads the format destination module 208 that can process the data format, and sends a START UP message 310 to initialize the format destination module 208. Subsequently, scanner control 202 may send one or more CAPABILITIES messages 312 through the target destination module 204 and through the access destination module 206 to the format.destination module 208.

After the capabilities have been set into all the modules, scanner control 202 sends a PASS REGION message 314 to the target destination module 204. The target destination module 204 passes this message on to the access mechanism destination module 206 which subsequently passes the message on to the format destination module 208. The PASS REGION message identifies all the regions within the document that were scanned into the system and which are available in the image store 216 (FIG. 2) so that the target, access, and format destination modules all know the regions that are available for transfer to the destination application 122. For each of the regions passed in the PASS REGION message 314, the scanner control 202 sends a WANTS DATA message 316 to determine whether the destination application 122 wants data from the particular region. After this series of messages is completed, the transfer parameters are established and all that remains to be done is the actual data formatting and transfer to the destination application 122. The scanner control 202 then sends a SINK message 318 which identifies the pipe-line 218 (FIG. 2) that is used to transfer the image data from the image store to the format destination where the data is formatted before being transferred to the destination application 122.

After receiving the SINK message, the format destination module 208 sends a series of PULL messages 320 to the image store 216 to retrieve data from the image store 216 and format it for the destination application 122. After all the data has been retrieved from the image store 216 and formatted by the format destination module 208, a SHUT DOWN message 322 is sent to stop the format process, and then a TRANSFER DATA message 324 is sent between the access mechanism destination module 206 and the destination application 122. The TRANSFER DATA message may send the actual data or it may only launch the application and send the name of a file into which the data has been stored. After sending the TRANSFER DATA message to the destination application 122, the scanner control 202 sends a shutdown message, which stops the data transfer.

As can be seen from FIG. 3, the target destination module 204, the access mechanism destination module 206, and the format destination module 208 each receive the same messages, thus they all have the same interface.

Figure 4:
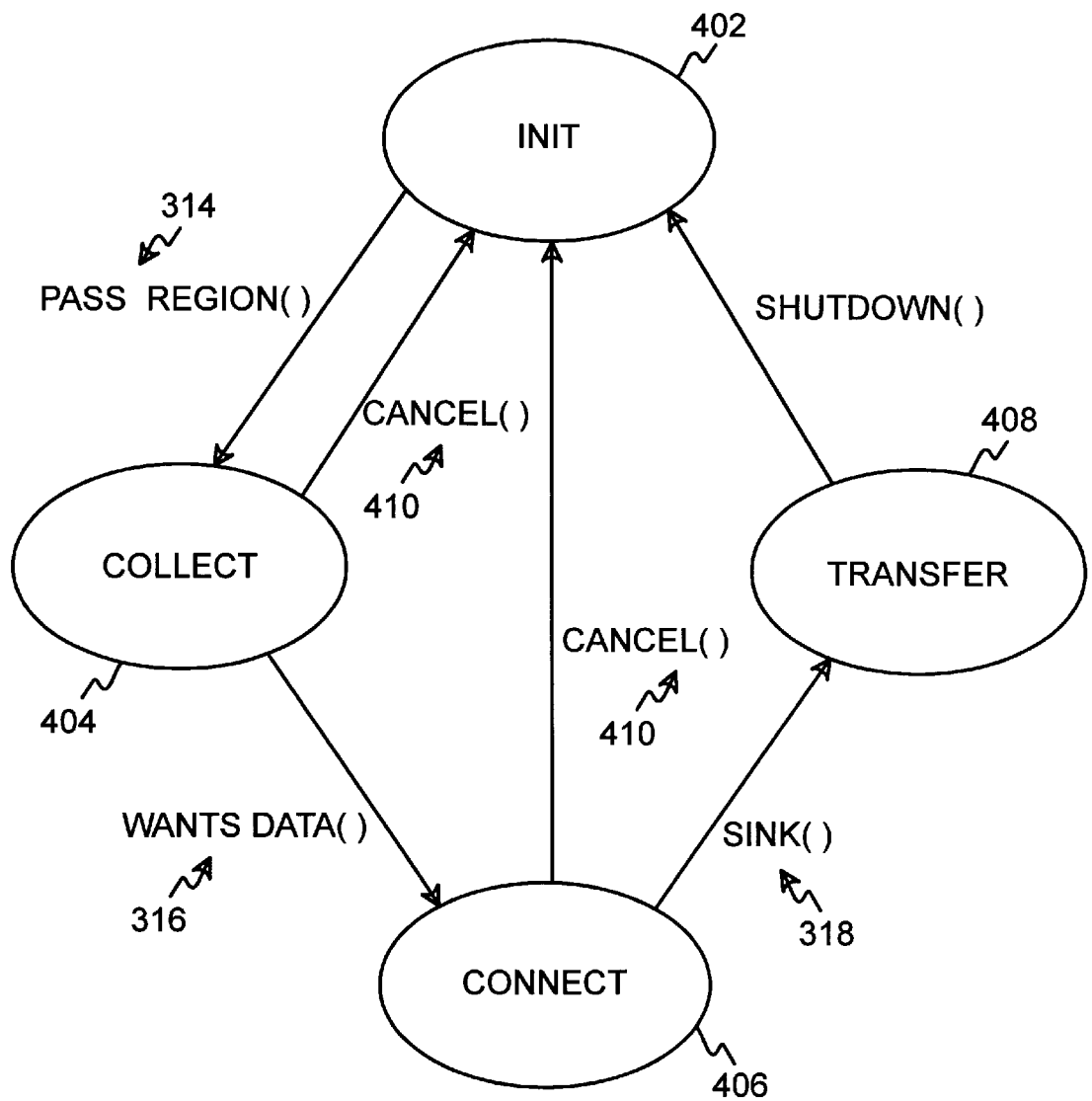
FIG. 4 shows a state diagram of the destination modules.

FIG. 4 shows a common state diagram for the destination modules. As described above, each of the destination modules has the same interface, and each also has a common state diagram of the various states in which they operate. Referring now to FIG. 4, INIT state 402 is the state in which the module resides when it is first started. The module remains in this state through the START UP and CAPABILITIES messages as shown above with respect to FIG. 3. Receipt of the PASS REGION message 314 sets the module into the COLLECT state 404 where the module collects information about all the data regions available to be transferred. After collecting this information, the WANTS DATA message 316 sets the destination module into the CONNECT state 406 where the module receives information about which of the regions collected in the COLLECT state 404 are to be transferred to the destination application 122. After determining which of the regions want data to be transferred, the SINK message 318 sets the destination module into the TRANSFER state 408. In the TRANSFER state 408, the destination module transfers the information from the image store 216 to the destination application 122. The SHUT DOWN message then sets the destination module back to the INIT state 402 where it terminates. Also, receipt of a CANCEL message 410 in any state resets the destination module back to the INIT state 402, and unloads all the modules.

Figure 5:
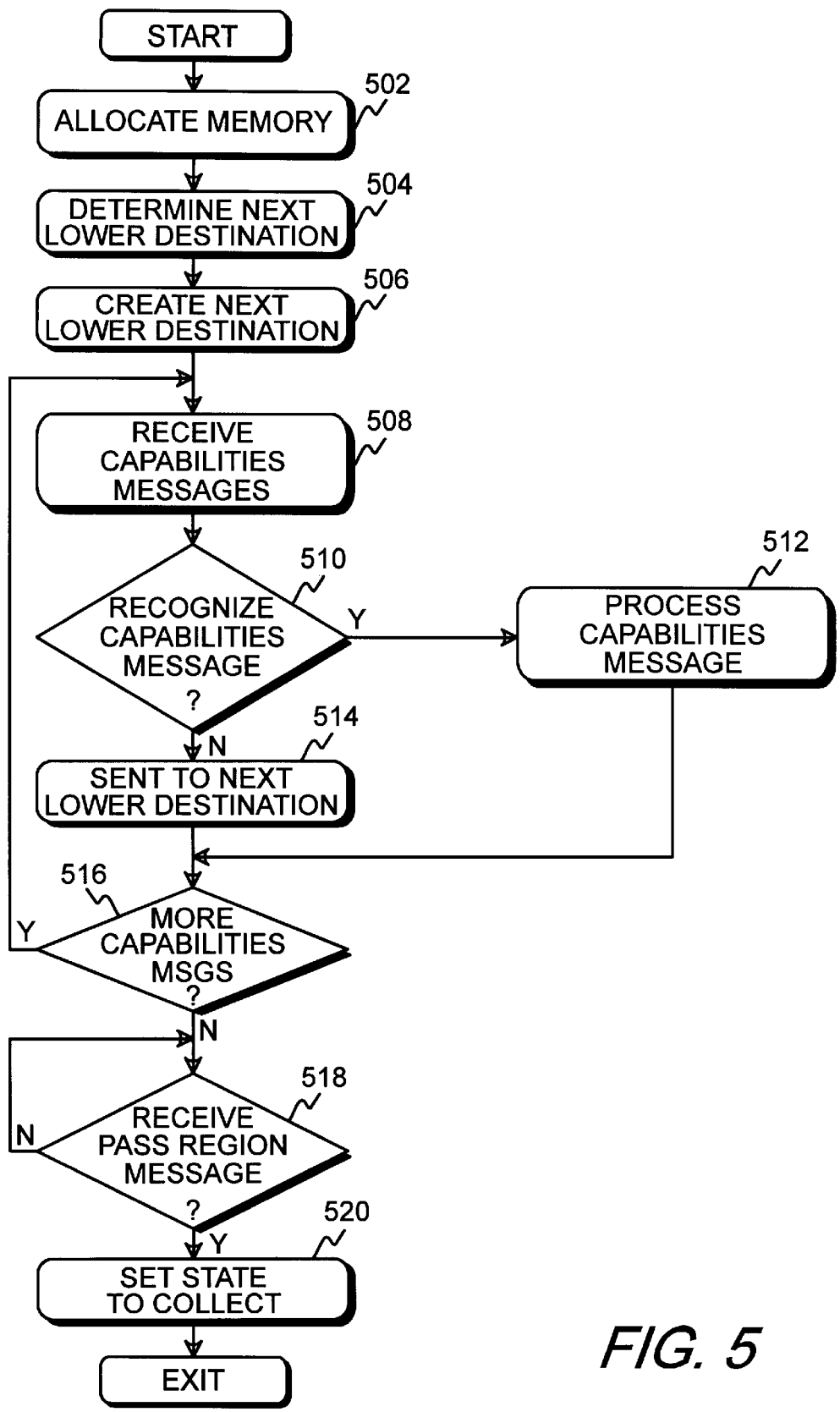
FIG. 5 shows a flowchart of the process of the init state.

FIG. 5 shows a flowchart of the process of the INIT state 402 (FIG. 4). Referring now to FIG. 5, after entry, block 502 allocates memory that is needed within the destination module. Block 504 then determines if there is a next lower destination module needed, for example if there is more than one access mechanism that can be used, the access mechanism would be chosen at this time. One example of choosing an access mechanism is described below with respect to FIG. 9. An example of choosing a data format, which would also be done in step 504, is shown below with respect to FIG. 10.

After determining the next lower destination, if there is to be a next lower destination, block 506 creates the next lower destination by loading the destination module and sending it a START UP message, which causes construction of the destination class. Block 508 then receives the first or next CAPABILITIES message and block 510 determines whether this particular destination module recognizes the CAPABILITIES message. If the CAPABILITIES message is recognized, this destination module will be processing the CAPABILITIES message, and control goes to 512 where the CAPABILITIES message is processed. If the CAPABILITIES message is not recognized, block 510 transfers to block 514 which sends the CAPABILITIES message to the next lower destination module. After processing the CAPABILITIES message, or after return from the next lower destination module, control goes to block 516 which determines whether there are more CAPABILITIES messages and if there are, returns to block 508 to read the next CAPABILITIES message. Those skilled in the art will recognize that the loop comprising 508, 510, 512 and 514 as well as the test in block 516 are actually accomplished by message passing within an object oriented system. After all the CAPABILITIES messages have been received, control goes to block 518 which waits for the PASS REGION message. After receiving the PASS REGION message 314, control goes to block 520 which sets the state of the destination module to the COLLECT state 404 and then exits.

Figure 6:
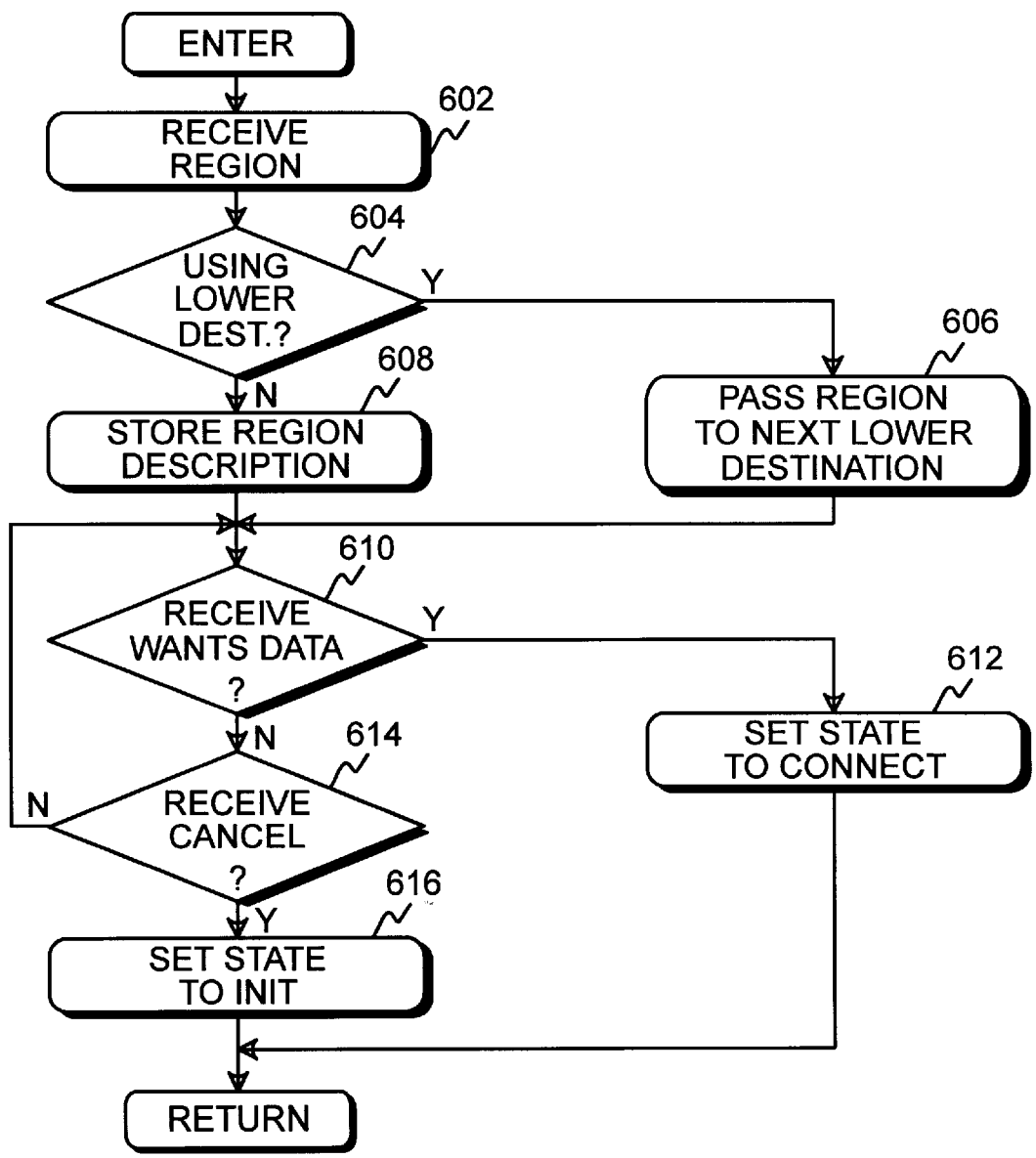
FIG. 6 shows a flowchart of the process of the collect state.

FIG. 6 shows a flowchart of the process of the COLLECT state 404 (FIG. 4). Referring now to FIG. 6, after entry, block 602 receives a region which was included in the PASS REGION message 314. Block 604 then determines whether a lower destination module is being used and if it is, block 604 transfers to block 606 which passes the region to the next lower destination. If there is no lower destination module in use, that is if this destination module is the lowest destination module, block 604 transfers to block 608 which stores the region description. Control then goes to block 610 which waits for the WANTS DATA message 316. When the WANTS DATA message 316 is received control goes to block 612 which sets the state to the CONNECT state 404 and returns.

If instead of receiving the WANTS DATA message 316, a CANCEL message 410 is received, block 614 transfers to block 616 which resets the state to the INIT state 402 before returning.

Figure 7:
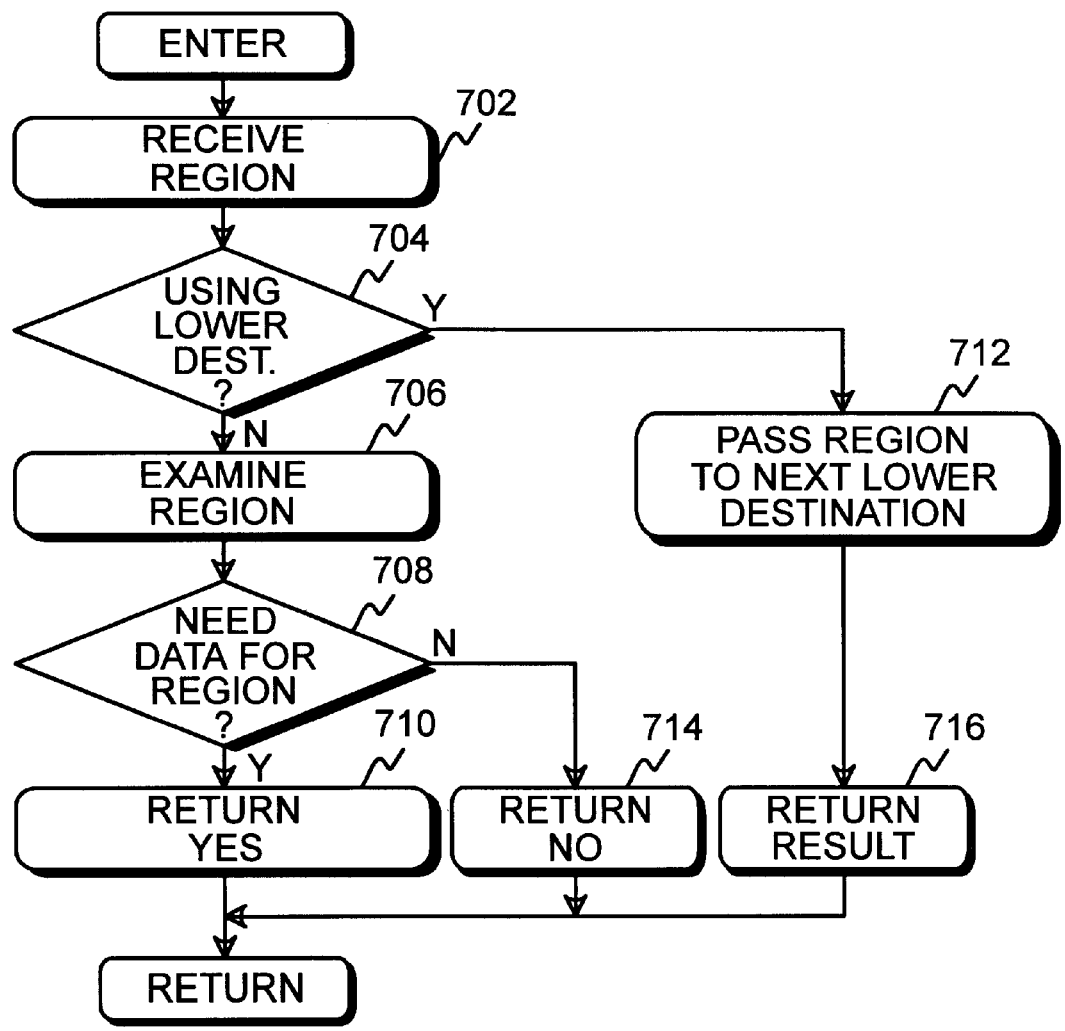
FIG. 7 shows a flowchart of the process of the connect state.

FIG. 7 shows a flowchart of the process of the CONNECT state 406 (FIG. 4). Referring now to FIG. 7, after entry, block 702 receives the region from the WANTS DATA message 316. Block 704 then determines whether a lower destination module is being used and if it is, transfers to block 712 which passes the region to the next lower destination module which determines whether the region wants data or not. After returning from the next lower destination module, block 716 returns the result determined by the lower destination module.

If a lower destination is not being used, block 704 transfers to block 706 which examines the region, and block 708 determines whether data is to be transferred from the region. If data is needed for the region, control goes to block 710 which returns yes to the WANTS DATA message 316, otherwise control goes to block 714 which returns no the WANTS DATA message 316.

Figure 8:
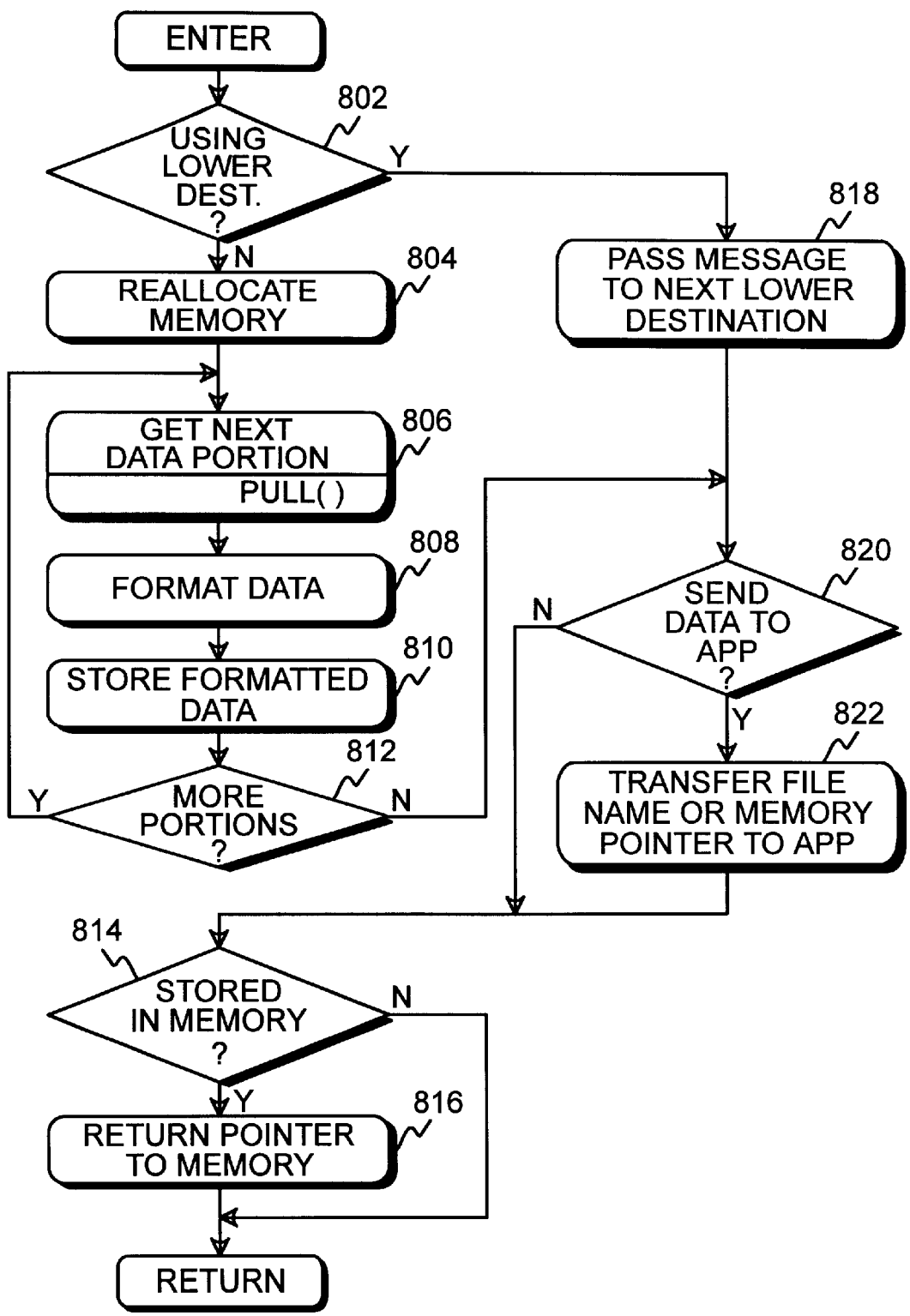
FIG. 8 shows a flowchart of the process of the transfer state.

FIG. 8 shows a flowchart of the process of the TRANSFER state 408 (FIG. 4). This state is entered when the SINK message 318 is received. Referring now to FIG. 8, block 802 determines whether a lower destination module is being used and if it is, transfers to block 818 which passes the SINK message 318 to the next lower destination. If a next lower destination message is not being used, control goes to block 804 which reallocates memory if necessary, to insure that sufficient memory exists to hold the regions being transferred to the destination application 122. Block 806 then uses the pipe-line identifier passed in with the SINK message 318 to issue a PULL message 320 to the image store 216 (FIG. 2) to retrieve the next data portion that is being transferred. After retrieving the data portion, block 808 formats the data and block 810 stores the formatted data. Block 812 then determines whether all of the data from the region has been transferred and if not, transfers back to block 806 to get the next portion of data. After all data portions have been transferred, block 812 goes to block 820.

Control arrives at block 820 after all the data portions have been received and formatted from the image store 216, either by this destination module or by the lower destination module called in block 818. Block 820 then determines whether this module is actually sending the data to the application, or whether it is being done by another destination module. If this destination module is sending the data, for example if the destination module being processed in this state is the access mechanism destination module 206, control goes to block 822 which transfers the file name or the actual memory pointer to the destination application 122. Control then goes to block 814 which determines whether the data is stored in memory and if it is, block 816 returns a pointer to the memory to the next higher destination module. Block 814 and block 816 would typically only be done in the lowest destination module, the format destination module 208.

Figure 9:
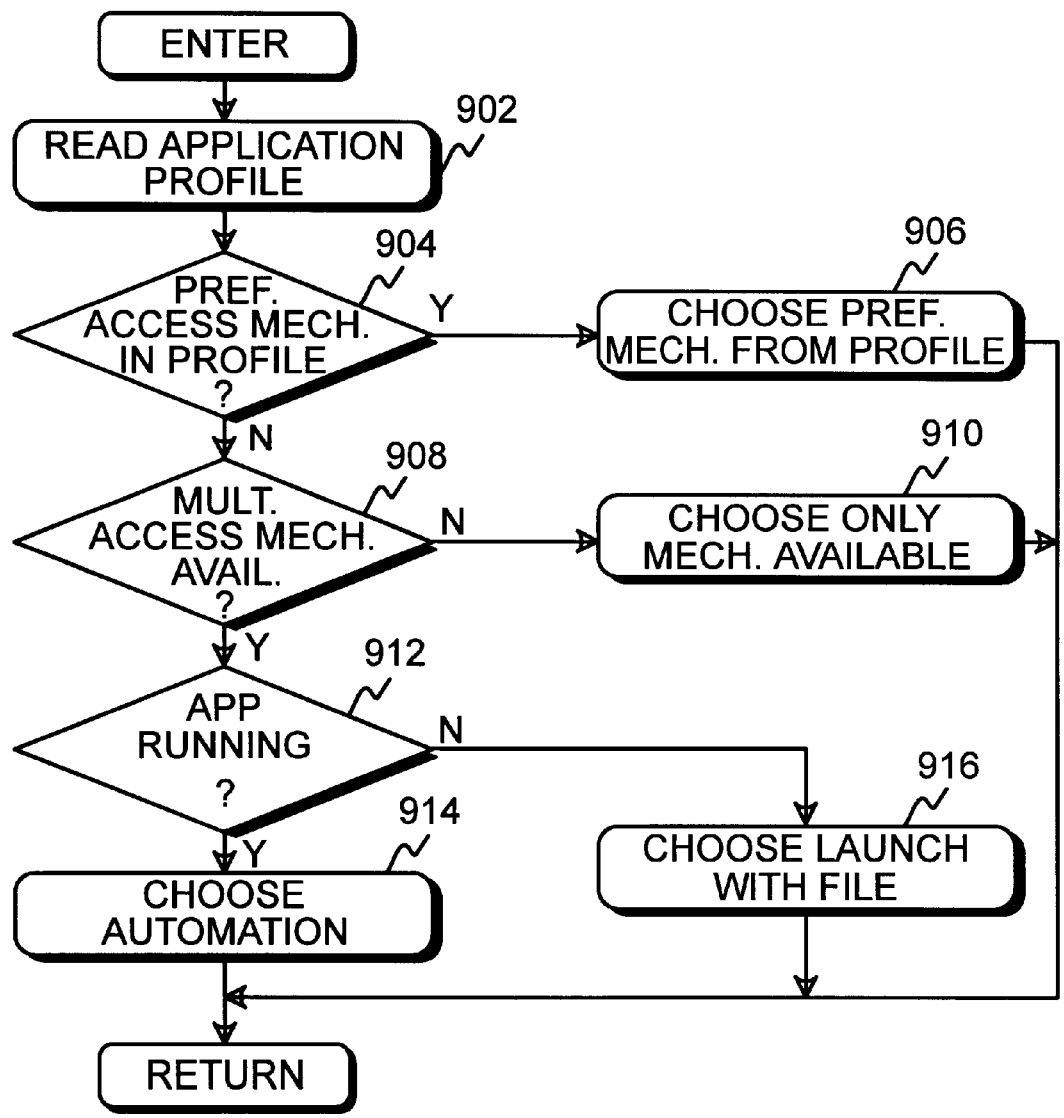
FIG. 9 shows a flowchart of a method for determining the access mechanism to be used.

FIG. 9 shows a flowchart of one method for determining the access mechanism to be used, wherein the method of this flowchart would be called from block 504 of FIG. 5 of a target destination module 204. Referring now to FIG. 9, after entry, block 902 reads the application profile file 214 (FIG. 2). In this example, the application profile contains a list of the access mechanisms that are available to transfer data to this particular application, and may define a preferred access mechanism for the particular application. Block 904 determines whether the application profile contains a preferred access mechanism, and if it does, control goes to block 906 to choose the preferred access mechanism and return.

If the application profile does not contain a preferred access mechanism, control goes to block 908 which determines whether more than one access mechanism is available and if not, transfers to block 908 which chooses the only available access mechanism and then returns.

If more than one access mechanism is available, for example both OLE automation and Launch With File, block 908 transfers to block 912. If the destination application is currently running, block 912 goes to block 914 which chooses the OLE automation access mechanism so that the data is transferred directly into a running application. If the application is not already running, block 912 transfers to block 916 which chooses the launch with file access mechanism, so that after a file of the data is built, the destination application will be started and the file name passed to the destination application which can load the file and process it.

Figure 10:
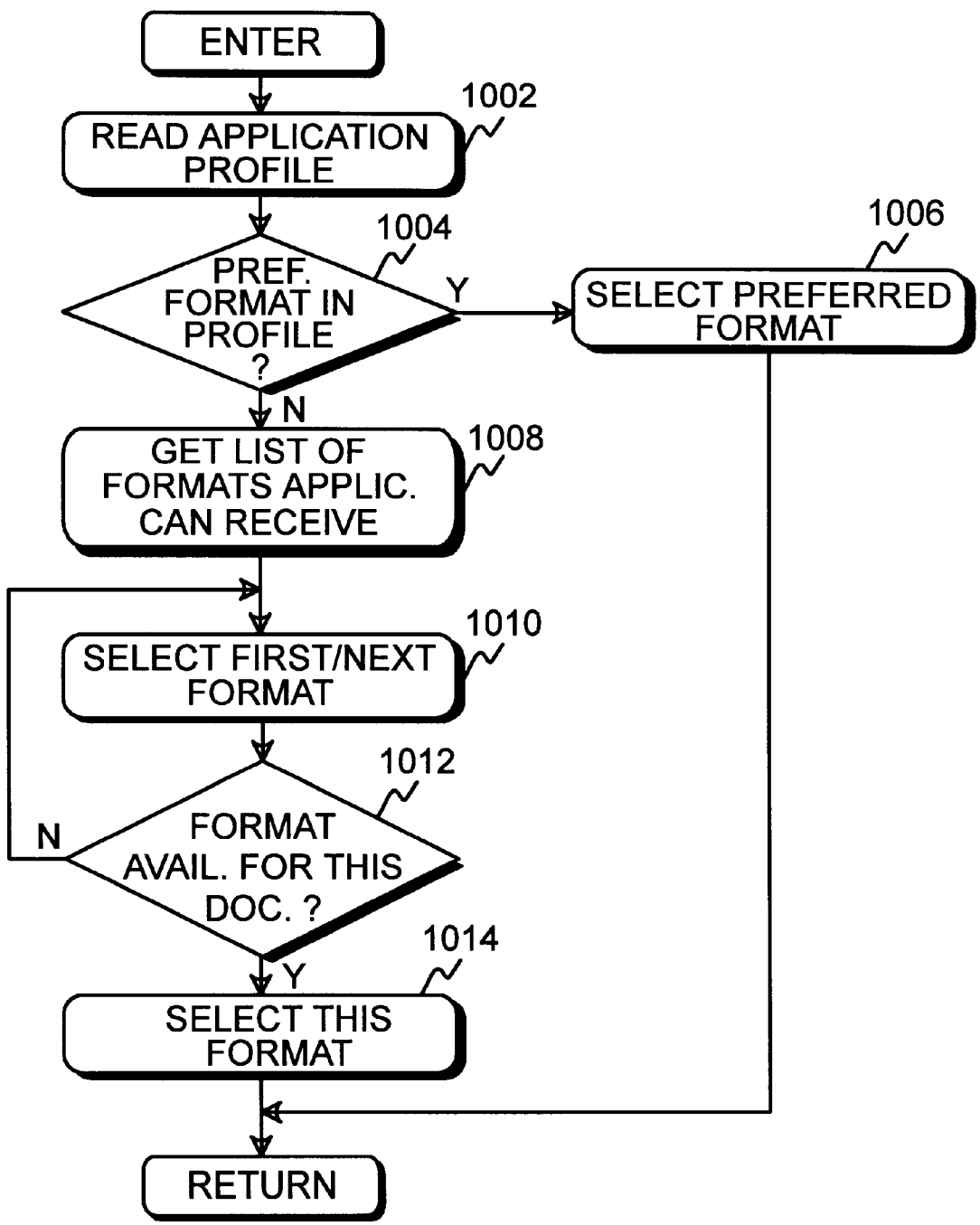
FIG. 10 shows a flowchart of a method for choosing a data format to be used.

FIG. 10 shows a flowchart of one method for choosing a data format to be used. Referring now to FIG. 10, after entry, block 1002 reads the application profile. In this example, the application profile may contain a list of the formats that are available to transfer data to this particular application, and may define a preferred format for the particular application. Block 1004 determines whether the application profile contains a preferred data format, and if it does, block 1004 transfers to block 1006 to select the preferred format and return.

If the application profile does not contain a preferred data format, block 1004 goes to block 1008 which gets a list of formats the application can receive. Block 1010 selects the first or next format and block 1012 determines whether the document is available in the selected format. If not, control goes back to block 1010 to select the next format. If the application can receive the select format, control goes to block 1014 to return the selected format.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method of transferring data from a source application program to a destination application program within a computer system, the method comprising the steps of:
   (a) selecting a first destination module designed to transfer data to the destination application;
   (b) initializing the first destination module, comprising the steps of
      (b1) identifying at least one access mechanism for transferring the data to the destination application, (b2) when more than one access mechanism is identified, selecting one access method, and (b3) when more than one access method is identified, initializing a second destination module for the selected access method comprising the steps of (b3a) identifying at least one data format for transferring the data to the destination application, (b3b) when more than one data format is identified, selecting one data format, and (b3c) when more than one data format is identified, initializing a third destination module for the selected data format;

(c) passing a list of available data regions from the source application to the destination modules;

(d) for each data region within the list passed in step (c), requesting, from the destination modules, an indication of whether data from the region is being transferred;

(e) transferring data from each region identified in step (d) to the destination modules, and formatting the data into the format selected in step (b); and (f) transferring the data formatted in step (e) to the destination application using the access method selected in step (b).

2. The method of claim 1 wherein in each of steps (c), (d), and (e) when a second destination module has been initialized, calling the second destination module to perform the operation.

3. The method of claim 2 wherein in each of steps (c), (d), and (e), when a third destination module has been initialized, calling the third destination module to perform the operation.

4. The method of claim 1 wherein when a second destination module is present, step (f) calls the second destination module to transfer the data to the destination application.

5. The method of claim 1 wherein step (b1) retrieves a list of access mechanisms from a profile file to identify at least one access mechanism.

6. The method of claim 5 wherein the profile file contains a list of access mechanisms for each of a plurality of destination applications.

7. The method of claim 1 wherein step (b2) selects a first access mechanism if the destination application is already running within the computer system and step (b2) selects a second access mechanism if the destination application is not running within the computer system.

8. The method of claim 1 wherein step (b3a) retrieves a list of data formats from a profile file to identify at least one access mechanism.

9. The method of claim 8 the profile file contains a list of data formats for each of a plurality of destination applications.

10. The method of claim 1 wherein step (b3b) selects a data format be selecting a data format that can be created from the data and can be accepted by the destination application, and that will retain more information than any other data format that can be created for the data and can be accepted by the destination application.

11. The method of claim 1 wherein all destination modules share a common interface.

12. The method of claim 1 wherein all destination modules have the same states.

13. A system of transferring data from a source application program to a destination application program within a computer system, the system comprising:

a target destination module for transferring data to the destination application comprising an initialization state for selecting an access mechanism module for transferring the data to the destination application, the access mechanism module comprising an initialization state for selecting a data format module for formatting the data being transferred and initializing the data format module;

a collection state in the target destination module, the access mechanism destination module, and the data format module, for receiving a list of available data regions within the data, the list being sent by the source application program;

a connection state in the target destination module, the access mechanism destination module, and the data format module, for examining each data region received in the collection state and identifying each data region from which data is being transferred; and a transfer state in the target destination module, the access mechanism destination module, and the data format module, transferring data from each region identified in the collection state, and for formatting the data into the format selected in the initialization state, and for transferring the formatted data to the destination application.

14. The system of claim 13 wherein the target destination module selects the access mechanism module from a list of access mechanism modules contained in a profile file.

15. The system of claim 13 wherein the access mechanism module selects the data format module from a list of access mechanism modules contained in a profile file.

16. The system of claim 13 wherein the data is transferred to the destination application from the access mechanism module.

17. The system of claim 13 wherein a running state of the destination application is used to select an access mechanism module.

* * * * *